L. L. BATTU.
STEAM REGENERATOR.
APPLICATION FILED OCT. 8, 1913.

1,128,837.

Patented Feb. 16, 1915.

WITNESSES:
C. D. Brooks.
E. W. Trowbridge

INVENTOR

UNITED STATES PATENT OFFICE.

LEONCE L. BATTU, OF NEW YORK, N. Y.

STEAM-REGENERATOR.

1,128,837. Specification of Letters Patent. Patented Feb. 16, 1915.

Application filed October 8, 1913. Serial No. 794,024.

*To all whom it may concern:*

Be it known that I, LEONCE L. BATTU, a citizen of the United States, residing in New York city, county and State of New York, have invented certain new and useful Improvements in Steam-Regenerators, of which the following is a full, complete, concise, and exact description, reference being had to the accompanying drawing, forming a part of this specification.

My invention relates to steam regenerators and has for its object the provision of an improved apparatus whereby exhaust steam from engines may be brought to a proper condition of pressure to render such exhaust steam adaptable for future use, particularly for power purposes, though I do not wish to be limited to the use to which such regenerated steam is put.

In practising my invention, I use a standard type of regenerator in conjunction with one or more heat storage reservoirs partially filled with water and I employ means such as a pump driven by a motor to circulate the water contained in the reservoirs through the regenerator proper. The regenerator is the principal means to absorb the heat contained in the flowing steam and the water pumped into the regenerator which is made to flow back into the reservoirs increases the heat storage capacity of the regenerator itself.

A further object of my invention consists in increasing the surface of contact of the water and steam in the regenerator by spraying the water, used as heat retainer in the regenerator and heat storage reservoirs, into the steam before it enters the mass of water contained in the regenerator itself.

Figure 2:
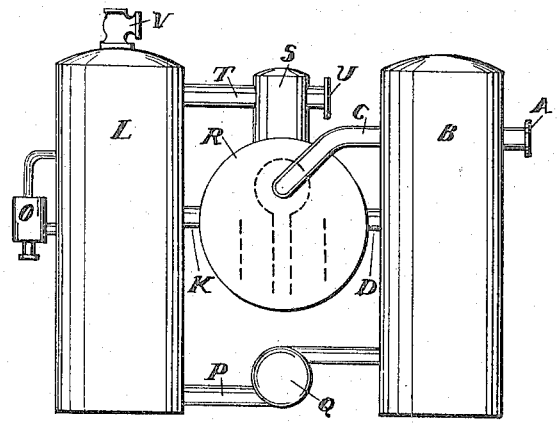
Figure 3:
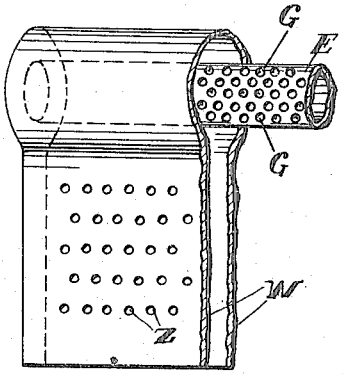
Figure 1:
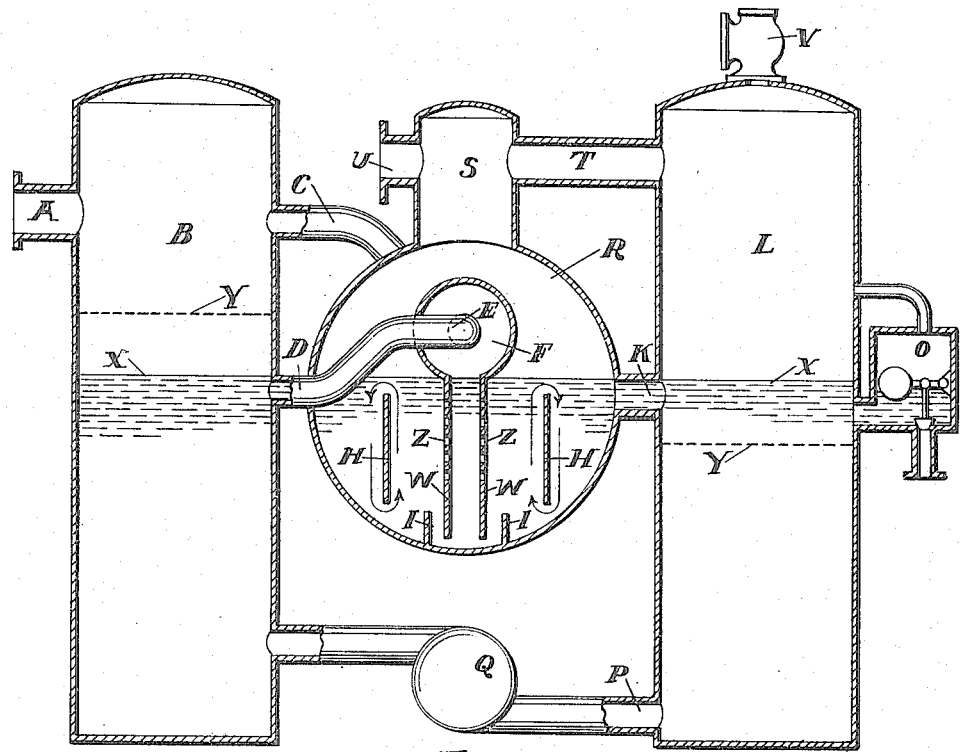

I will explain my invention more fully by reference to the accompanying drawing, Figure 1 showing a cross section through the equipment, Fig. 2 showing an end view of the apparatus shown in cross section Fig. 1, and Fig. 3 being a detailed view of the regenerator steam tube and water tube shown in end view in cross section Fig. 1.

In Fig. 1, R is a steam regenerator of the induction type; *i. e.*, a regenerator in which the circulation of water is due to the passage of steam in the water. B and L are heat storage reservoirs partially filled with water. A is an inlet for steam, which may be discharged by an intermittent acting engine or the like. C is a pipe leading steam from reservoir B to tube F. W, W, are the prolongation of pipe F into the water of regenerator R. Z, Z are openings made in prolongations W, W, which allow steam introduced in pipe F to escape into the water contained in regenerator R. H, H are baffle plates extending from end to end of regenerator R and having as object to direct the circulation of the liquid around themselves, as shown by the arrows in Fig. 1. K is a duct or channel allowing water to flow from regenerator R to reservoir L. T is a channel allowing steam to flow from reservoir L to dome S located on top of regenerator R. U is a pipe leading regenerated steam from dome S of regenerator R to its point of use. P is a pipe leading water from reservoir L to reservoir B. Q is a pump located in pipe P and adapted to propel the water from reservoir L to reservoir B. D is a pipe adapted to allow the water to flow from reservoir B to regenerator R. Pipe D enters pipe F and is extended into pipe F by means of tube E, which is shown in detail in Fig. 3. G, G are perforations in pipe E adapted to distribute the water pumped by pump Q through pipe D into the steam carried by pipe F in divided streams. V is a relief valve having as purpose the limitation of pressure in the regenerator R. O is a water level regulating device such as is customarily used in regenerator equipment. X, X is the water level when the regenerator is not operating. I, I are plates extending the whole length of regenerator R on each side of the prolongations W of pipe F, having as object to oblige the water pumped into pipe F and which is not discharged through openings Z to flow into the channel formed between W and I upward, and thereby to promote the water circulation around baffle plates H, H.

When pump Q is started the water level in reservoir L is lowered and the water level in reservoir B rises until it reaches level Y, then the water of reservoir B flows through pipe D into pipe E and is sprayed into the steam contained in pipe F. The water sprayed in this manner is put into intimate contact with steam at a higher pressure than the regenerated steam which flows through the dome S and pipe U. This is due to the head of water over the perforations Z, which creates some back pressure on the steam flowing through regenerator R. The water of regenerator R flows back into reservoir L through pipe K. There is, therefore, a circulation of water from reservoir L to reservoir B and from reservoir B to reservoir L through the regenerator R. When the water passes through regenerator R, it is thoroughly mixed with the flowing steam and reaches a temperature which is practically equal to the temperature of the steam itself. When the steam has stopped flowing and the regenerator is discharging steam, steam will be supplied by the water contained in regenerator R and by the water contained in reservoir L and also by the water contained in reservoir B, which is being continuously sprayed into regenerator R. I have provided a passage T for the steam regenerated in reservoir L. The injection of water through pipe E during periods of quiescence (by this I mean during periods when no steam is injected into the regenerator) will allow for a certain amount of circulation of water. This flow of water will be upward as directed by W, W, the downward portions of pipe F, and the plates I. This upward motion will tend to circulate the water in the regenerator, bringing the lower layers nearer the surface. The static head of these layers of water will diminish and they will have a tendency to vaporize steam which would not vaporize if this ascending motion did not take place. The storing action of heat in the equipment I have described is extremely rapid in regenerator R. Part of the heat absorbed by regenerator R is stored up in the water contained respectively in reservoirs L and B.

I have provided means which greatly increase the storage capacity of the regenerator without having to increase the size of the regenerator proper above the size it must have to properly condense the steam flowing into it.

It will be seen that by means of my invention a large amount of heat can be stored in reservoirs L and B independently of the amount stored in regenerator R. Instead of being blown through relief valve V a portion of the excess steam will be stored in the reservoirs L and B. During periods of deficiency of steam the heat contained in reservoirs L and B will become available to the apparatus utilizing the steam discharged by the regenerator.

It is well known in the art that a regenerator can receive at certain periods amounts of steam largely in excess of the demand for steam from regenerator, and also in excess of its heat storage capacity. By means of my invention these excesses of steam will be used partially or completely to heat up the water contained in heat reservoirs L and B.

I have not attempted to explain the functions of valve V and water level regulator O, as these accessories in steam regenerator practice are well known to those skilled in the art.

Having thus described my invention, I claim as new and desire to secure by Letters Patent:

1. In a steam regenerator equipment a steam regenerator proper, means to inject the steam to be regenerated into the body of liquid contained in said steam regenerator, a heat storage reservoir, means to circulate the liquid from the regenerator proper to said reservoir and means to discharge steam from the regenerator proper and from the heat storage reservoir, both at the same pressure.

2. In a steam regenerator equipment, a steam regenerator proper containing a body of liquid, means to circulate the body of liquid contained in said steam regenerator proper by the inductive action of steam discharged and directed into said body of liquid, a heat storage reservoir containing an additional body of liquid, pumping means adapted to circulate the liquid contained in the regenerator proper and the heat storage reservoir.

3. In a steam regenerator equipment, a steam regenerator proper of the induction type containing a body of liquid, a heat storage reservoir containing an additional body of liquid, pumping means motor driven adapted to circulate the liquid from the regenerator into the heat storage reservoir and cooling means common to the liquid contained in the regenerator proper and the heat storage reservoir.

4. In a steam regenerator equipment, a steam regenerator proper, a heat storage reservoir, pumping means to circulate the liquid from the regenerator proper into the heat storage reservoir, means to condense and evaporate steam in the regenerator and means to evaporate steam from the heat storage reservoir and means to equalize the pressure of the steam evaporated in the regenerator and in the heat storage reservoir.

In witness whereof, I hereunto subscribe my name this 6th day of October A. D., 1913.

LEONCE L. BATTU.

Witnesses:
E. W. TROWBRIDGE,
C. S. BROOKS.

Copies of this patent may be obtained for five cents each, by addressing the "Commissioner of Patents, Washington, D. C."